(12) United States Patent
Johnsen

(10) Patent No.: US 10,437,430 B2
(45) Date of Patent: Oct. 8, 2019

(54) QUEUING ACTIONS RECEIVED WHILE A CLIENT DEVICE IS OFFLINE FOR EXECUTION WHEN CONNECTIVITY IS RESTORED BETWEEN THE CLIENT DEVICE AND A DIGITAL MAGAZINE SERVER

(71) Applicant: Flipboard, Inc., Palo Alto, CA (US)

(72) Inventor: Timothy James Johnsen, San Francisco, CA (US)

(73) Assignee: Flipboard, Inc., Palo Alto, CA (US)

( * ) Notice: Subject to any disclaimer, the term of this patent is extended or adjusted under 35 U.S.C. 154(b) by 541 days.

(21) Appl. No.: 14/725,207

(22) Filed: May 29, 2015

(65) Prior Publication Data

US 2016/0349941 A1 Dec. 1, 2016

(51) Int. Cl.
*G06F 3/0483* (2013.01)
*H04L 29/08* (2006.01)
*H04L 29/06* (2006.01)

(52) U.S. Cl.
CPC .......... *G06F 3/0483* (2013.01); *H04L 67/28* (2013.01); *H04L 67/2861* (2013.01); *H04L 69/28* (2013.01)

(58) Field of Classification Search
CPC ........................ G06F 3/0482; G06F 3/04842
See application file for complete search history.

(56) References Cited

U.S. PATENT DOCUMENTS

| | | | | |
|---|---|---|---|---|
| 6,750,766 B1* | 6/2004 | Heitner | ................... | G06F 17/30 340/525 |
| 2008/0120670 A1* | 5/2008 | Easton | ................... | H04N 7/173 725/115 |
| 2009/0247134 A1* | 10/2009 | Jeide | ................... | H04L 67/2842 455/414.2 |
| 2012/0149342 A1* | 6/2012 | Cohen | ................... | H04L 12/587 455/412.2 |
| 2013/0103792 A1* | 4/2013 | Buchheit | ................ | H04L 67/02 709/217 |

* cited by examiner

*Primary Examiner* — Jennifer N To
*Assistant Examiner* — Ashley M Fortino
(74) *Attorney, Agent, or Firm* — Fenwick & West LLP

(57) ABSTRACT

A digital magazine application associated with a digital magazine server executes on a client device and allows a user to interact with content from the digital magazine server even when the client device is unable to communicate with the digital magazine server. When the application detects loss of communication with the digital magazine server, interactions received by the application after the loss of communication has been detected are stored in a queue on the client device. When communication with the digital magazine server is reestablished, interactions from the queue are communicated to the digital magazine server. Certain interactions having less than a threshold measure of time dependency are stored in the queue in an order based on their associated timestamps, allowing the stored interactions to be later executed in an appropriate order by the digital magazine server.

16 Claims, 3 Drawing Sheets

QUEUING ACTIONS RECEIVED WHILE A CLIENT DEVICE IS OFFLINE FOR EXECUTION WHEN CONNECTIVITY IS RESTORED BETWEEN THE CLIENT DEVICE AND A DIGITAL MAGAZINE SERVER

BACKGROUND

This invention relates generally to interactions by a user with content presented via a client device while the client device is offline, and more specifically to determining an order of subsequently executing interactions received while the client device is offline.

A digital magazine identifies content items for presentation to a user, with many content items identified by a digital magazine server or a digital magazine application based on user-defined preferences or parameters. As a user interacts with content items presented in a digital magazine, the user's interactions may be used by the digital magazine server or by the digital magazine application to identify additional content items for presentation to the user via the digital magazine. However, a client device operated by a user to interact with content items presented in a digital magazine may lose connectivity with a digital magazine server while the user interacts with the digital magazine, preventing certain interactions by the user with content items from being communicated to the digital magazine server. This may impair selection of subsequent content items by the digital magazine server for presentation via the digital magazine, which may decrease subsequent user interaction with the digital magazine.

SUMMARY

A digital magazine server retrieves content from one or more sources and generates a personalized, customizable digital magazine for a user based on the retrieved content. The user views and interacts with content items included in the digital magazine using a client device (e.g., a mobile communication device, tablet, computer, and any other suitable computing system) executing an application associated with the digital magazine server. For example, the digital magazine server selects content items for presentation to a user based on the user's interests and preferences and sends the content items along with instructions for display to the application associated with the digital magazine server executing on the client device. But the client device may be unable to communicate with the digital magazine server at certain times. For example, when the client device loses connectivity to a network, the client device is unable to communicate with the digital magazine server. However, while the client device is unable to communicate with the digital magazine server, the user may continue to interact with content items previously provided to the client device by the digital magazine server. The application associated with the digital magazine server executing on the client device may communicate certain interactions to the digital magazine server for completion, so an inability to communicate with the digital magazine server prevents the certain interactions from being executed, which may impair user interaction with the digital magazine. Accordingly, when the client device is unable to communicate with the digital magazine server, the application associated with the digital magazine server executing on the client device stores interactions with content items in the digital magazine in a local queue for subsequent execution by the digital magazine server.

In one embodiment, when the client device detects an inability to communicate with the digital magazine sever or detects a loss of connectivity with the digital magazine server and receives a set of interactions with the application associated with the digital magazine server, the application associated with the digital magazine server executing on the client device stores the set of interactions in a queue. Each interaction in the set is associated with a timestamp identifying a time when the interaction was received by the application associated with the digital magazine server and may also be associated with identifiers of one or more content items. Example interactions include: posting a content item to the digital magazine server, deleting a content item from the digital magazine server, editing a content item stored by the digital magazine server, sharing a content item stored by the digital magazine server with another user, requesting additional content associated with a content item, or any other suitable interaction.

The application associated with the digital magazine server executing on the client device also determines a type associated with each interaction in the set. A type associated with an interaction describes a measure of time dependency of the interaction. An interaction having at least a threshold measure of time dependency is undesirable to be performed if at least a threshold time interval has passed since the application associated with the digital magazine server received the interaction. In contrast, an interaction having less than the threshold measure of time dependency may be performed regardless of a length of time that has elapsed since the interaction was received by the application associated with the digital magazine server. For example, an interaction to provide a comment on a content item has greater than the threshold measure of time dependency as the comment may be duplicative or incongruous with other comments received during the threshold time interval after the application associated with the digital magazine server receives the interaction to provide the comment. In one embodiment, the application associated with the digital magazine server maintains information identifying interactions having less than the threshold measure of time dependency, such as a list identifying interactions with at least the threshold measure of time dependency. If an interaction in the set is included in the list, the application associated with the digital magazine server associates a type with the interaction indicating the interaction has at least the threshold measure of time dependency. Example interactions having a measure of time dependency equaling or exceeding the threshold include: posting a content item to the digital magazine server, deleting a content item from the digital magazine server, editing a content item stored by the digital magazine server, commenting on a content item stored by the digital magazine server, and purchasing an object identified by a content item included in the digital magazine server.

Interactions in the set received by the application associated with the digital magazine server are stored in the queue on the client device in an order that is based at least in part on timestamps and types associated with the interactions. For example, interactions having a type indicating they have less than the threshold measure of time dependency are stored in the queue in an order based on their associated timestamps; in some embodiments, the interactions having a type indicating they have less than the threshold measure of time dependency have an order so interactions with older timestamps have a higher position in the order. When ordering the interactions, the application associated with the digital magazine server may also account for dependencies between interactions in the set. For example, if an interaction in the set depends on an additional interaction, the order of the interactions stored in the queue places the additional interaction in a higher position in the order than the interaction. Additionally, the application associated with the digital magazine server also stores a priority associated with interactions and determines the order in which the interactions in the set based in part on the priorities associated with the interactions; for example, interactions in the set associated with higher priorities have higher positions in the queue than interactions with lower priorities.

When the application associated with the digital magazine server detects connectivity between the client device and the digital magazine server, the application communicates the queue from the client device to the digital magazine server. Alternatively, the application associated with the digital magazine server executes interactions in the queue in the order in which they were stored in the queue, so the application communicates interactions in the queue to the digital magazine server for execution. The digital magazine server receives interactions stored by various client devices while the client devices were unable to communicate with the digital magazine server and generates a global queue of interactions for execution based on the interactions received from the client devices. Based on types and timestamps associated with interactions received from client devices, the digital magazine server orders interactions in the global queue.

In some embodiments, the digital magazine server filters the received interactions by one or more criteria when generating the global queue. For example, the digital magazine server determines whether a content item associated with a received interaction has been deleted prior to the digital magazine server receiving the interaction. If the content item has been deleted, the digital magazine server does not include interactions associated with the content item in the global queue. As another example, if an interaction received by the digital magazine server is an interaction to delete a content item, since each interaction is dependent on at least a state of a content item or content of a content item, the digital magazine server does not include interactions associated with the content item and having timestamps later than a timestamp of an interaction requesting deletion of the content item in the global queue.

The digital magazine server may generate the global queue by combining interactions included in queues received from client devices based on timestamps associated with the interactions and types associated with the interaction, similar to generation of a queue by the application associated with the digital magazine server executing on a client device. For example, the global queue orders interactions from client devices so an interaction associated with an oldest timestamp has a highest position in the order. Similar to generation of a queue by a client device, the digital magazine server may account for priorities of various interactions and dependencies between interactions when generating the global queue. Based on the order of interactions in the global queue, the digital magazine server executes the interactions received from the client devices and modifies content items maintained by the digital magazine server.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
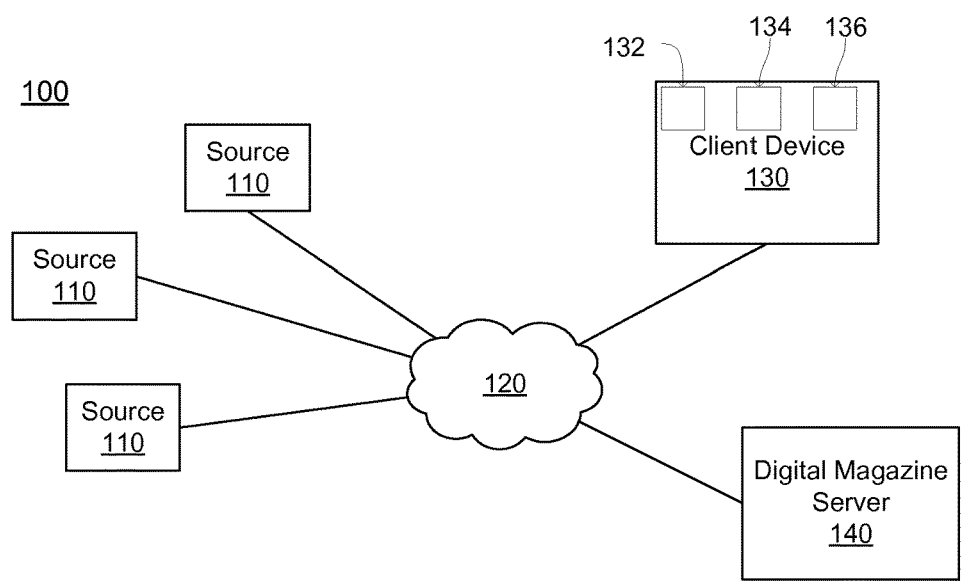
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) extensible markup language (XML) or JavaScript Object Notation (JSON). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 130 to interact with the digital magazine server 140. For example, an application executing on the client device 130, such as application 136 described further below, communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

A client device 130 also includes an application 136 associated with the digital magazine server 140 that executes on the client device 130. The application 136 determines whether the client device 130 is capable of communicating with the digital magazine server 130. For example, the application 136 determines whether the client device 130 has a connection to the network 120, if a connection to the network 120 by the client device 130 has at least a threshold quality, or if communication between the client device 130 and the digital magazine server 140 is lost. Responsive to determining the client device 130 is unable to communicate with the digital magazine server 140 or with the network 120, the application 136 determines a type associated with interactions received by the application 136 while the client device 130 is unable to communicate with the digital magazine server 140 and stores a set of the received interactions in a queue, as further described below in conjunction with FIG. 4. When the application 136 determines the client device 130 has established communication with the network 120 or with the digital magazine server 140, the application 136 communicates the queue or interactions from the queue to the digital magazine server 140 for execution, as further described below in conjunction with FIG. 4.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
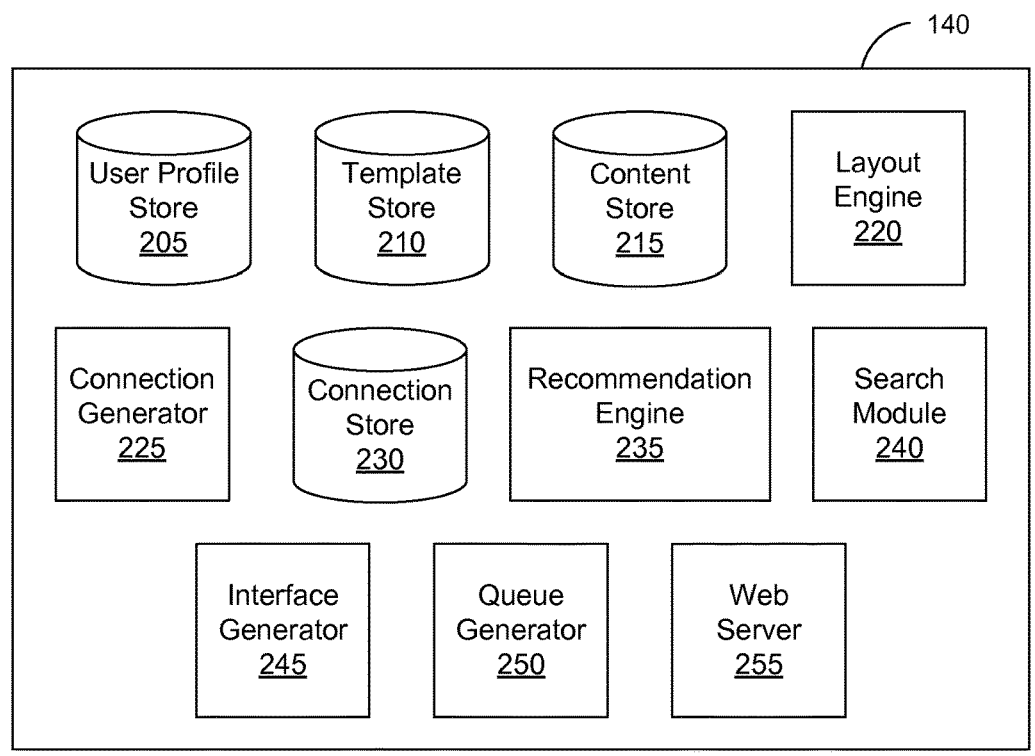
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, a queue generator 250, and a web server 255. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130.

Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, and U.S. patent application Ser. No. 13/938,227, filed on Jul. 9, 2013, each of which is hereby incorporated by reference in its entirety.

The content store 215 stores objects that each represent various types of content. For example, the content store 215 stores content items received from one or more sources 110 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

Additionally, the content store 215 may maintain a global queue including interactions received from various client devices 130 and an order in which interactions in the global queue are to be executed. For example, the digital magazine server 140 receives queues including interactions received by various client devices 130 from the client devices 130 and the queue generator 250, further described below, generates a global queue including interactions form the received queues and an order to execute the interactions from the received queues. As another example, the digital magazine server 140 receives interactions from various client devices 130 and generates the global queue including the received interactions based on information associated with the received interaction, as further described below in conjunction with FIG. 4.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. Examples of using a page template to present content items are further described in U.S. patent application Ser. No. 13/187,840, filed on Jul. 21, 2011, U.S. patent application Ser. No. 13/938,223, filed on Jul. 9, 2013, and U.S. patent application Ser. No. 13/938,226, filed on Jul. 9, 2013, each of which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether the content items are presented using the digital magazine server 140 or using another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The global queue generator 250 receives interactions from client devices 130 that were stored by the client devices 130 while the client devices were unable to communicate with the digital magazine server 140 as well as timestamps and types associated with the received interactions. Based at least in part on timestamps and types associated with the received interactions, the global queue generator 250 generates a global queue including at least a set of the received interactions in an order in which the received interactions are to be executed. As further described below in conjunction with FIG. 4, a type associated with a received interaction is based at least in part on a measure of time dependency of the interaction. For example, interactions having less than a threshold measure of time dependency are associated with a specific type and interactions having at least the threshold measure of time dependency are associated with an alternative type. Based on the timestamps and types associated with various interactions, the global queue generator 250 generates a global queue of interactions in an order in which the digital magazine server 140 executes the interactions. In various embodiments, the digital magazine server 140 stores the generated global queue in the content store 215 and executes the interactions in the order in which they are included in the queue, as further described below in conjunction with FIG. 4.

The web server 255 links the digital magazine server 140 via the network 120 to the one or more client devices 130, as well as to the one or more sources 110. The web server 255 serves web pages, as well as other content, such as JAVA®, FLASH®, XML and so forth. The web server 255 may retrieve content item from one or more sources 110. Additionally, the web server 255 communicates instructions for generating pages of content items from the layout engine 255 and instructions for processing received input from the interface generator 245 to a client device 130 for presentation to a user. The web server 255 also receives requests for content or other information from a client device 130 and communicates the request or information to components of the digital magazine server 140 to perform corresponding actions. Additionally, the web server 255 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by the application 136 associated with the digital magazine server 140 and executing on a client device 130, or may be provided by a combination of the digital magazine server 140 and the application 136 associated with the digital magazine server 140 and executing on the client device 130. In one embodiment, the application 136 associated with the digital magazine server 140 and executing on the client device 130 determines the client device 130 is unable to communicate with the digital magazine server 140, determines a type associated with interactions with the application 136 received after the determination, and stores the received interactions in a queue. When the application 136 determines the client device 140 is capable of communicating with the digital magazine server 140, the application 136 communicates the queue or communicates interactions from the queue to the digital magazine server 140, which subsequently executes interactions, as further described below in conjunction with FIG. 4. In another embodiment, the application 136 stores interactions and timestamps associated with the interactions received after determining the client device 130 is unable to communicate with the digital magazine system 140 and communicates the stored interactions to the digital magazine server 140 when the application 136 determines the client device 130 is capable of communicating with the digital magazine server 140, which determines a type for each interaction. Based in part on the timestamps associated with the interactions and the determined types, the digital magazine server 140 generates a queue including the interactions in an order in which the digital magazine server 140 executes the interactions and executes the interactions based on the order.

Page Templates

Figure 3:
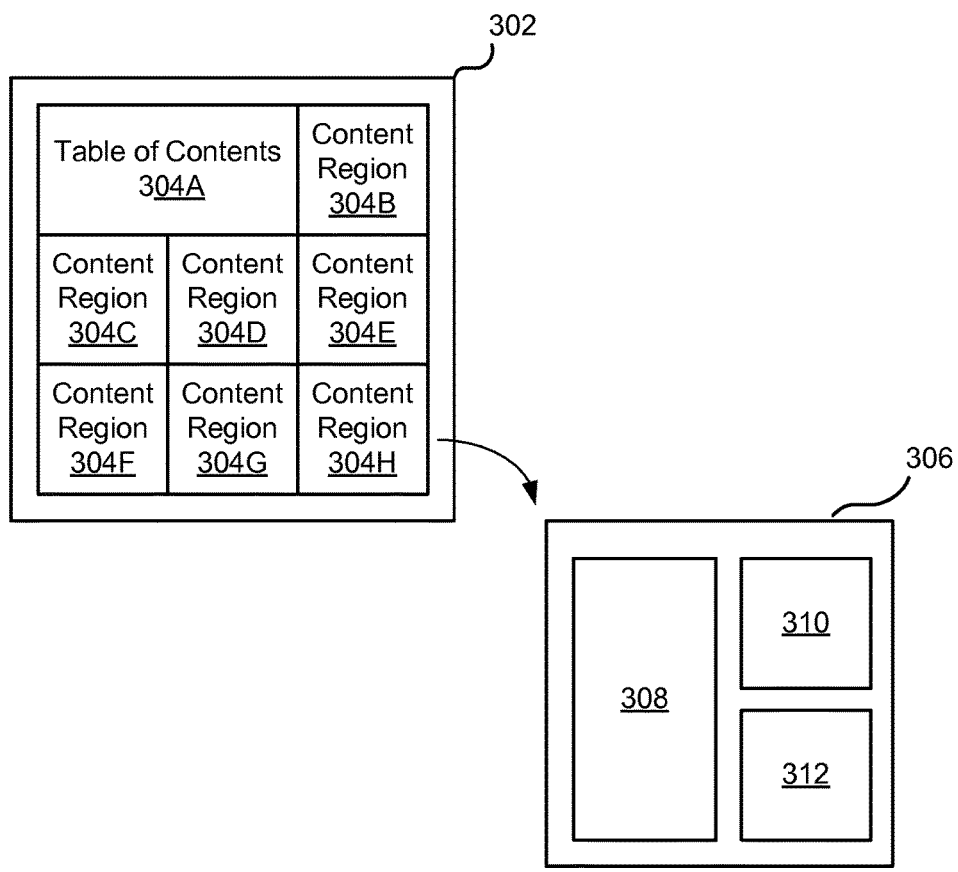
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such as the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Figure 4:
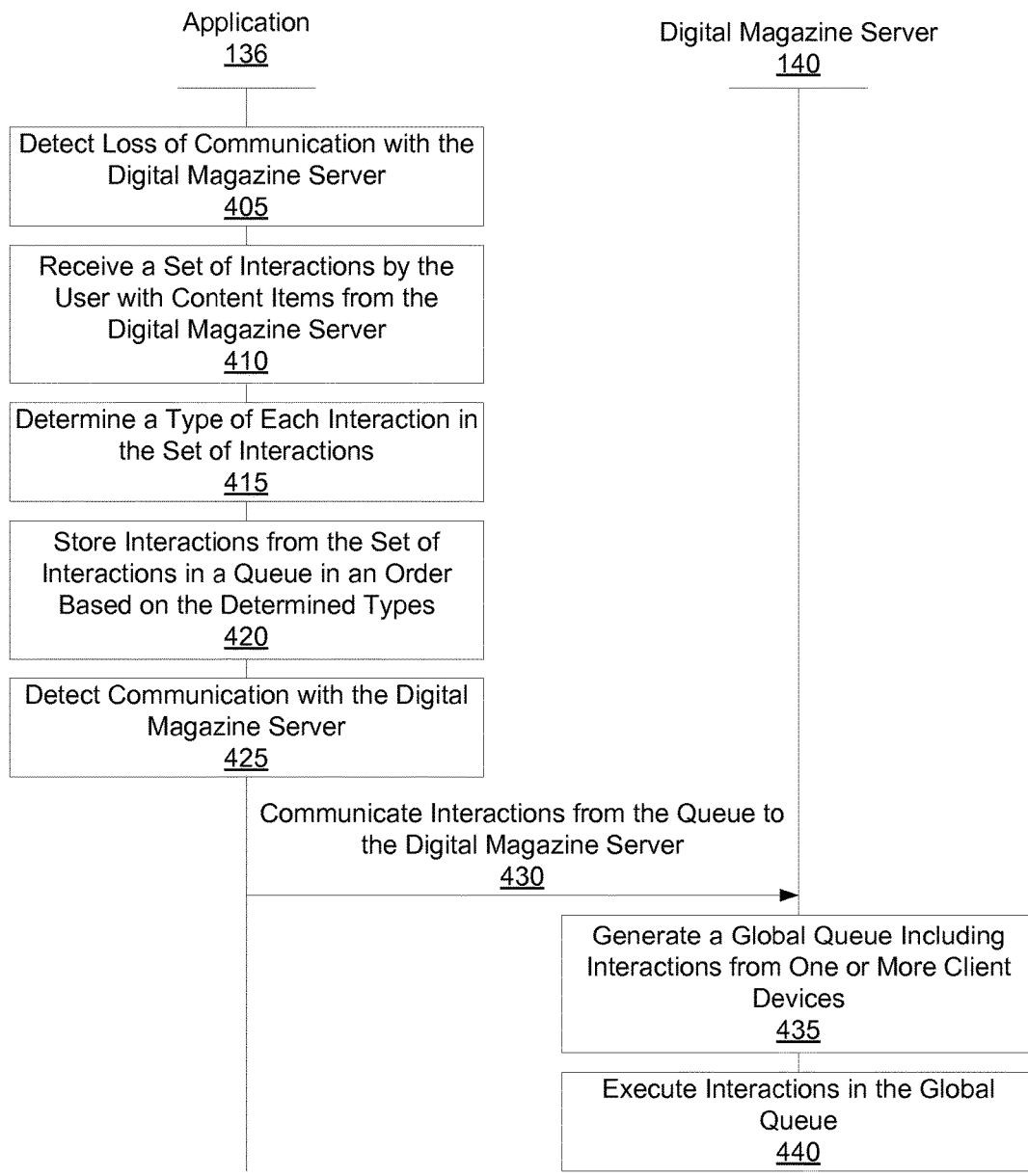
FIG. 4 is an interaction diagram of a method for queuing interactions with content items presented in a digital magazine for execution, in accordance with an embodiment of the invention.

Queuing Actions Received While Unable to Access a Digital Magazine Server for Execution FIG. 4 is an interaction diagram of one embodiment of a method for queuing interactions with content items presented in a digital magazine for execution. In other embodiments, the method may include different and/or additional steps than those shown in FIG. 4. The functionality described in conjunction with the application 136 associated with the digital magazine server 140 and executing on the client device 110 in FIG. 4 may be provided by any other suitable application executing on the client device 130 in other embodiments.

The application 136 associated with the digital magazine server 140 executes on a client device 130, presents content items from the digital magazine server 140 to a user of the client device 140, and receives interactions with content items or with the digital magazine server 140 from a user of the client device. Based on information from the client device 130, the application 136 associated with the digital magazine server 140 detects 405 a loss of communication between the client device 130 and the digital magazine server 140. For example, the application 136 determines a strength of a connection between the client device 130 and a network 120 is less than a threshold value. As another example, the application 136 detects 405 the client device 130 is unable to communicate with the digital magazine server 140 if greater than a threshold time has elapsed between the application 136 communicating a request to the digital magazine server 140 and the application 136 receiving a response from the digital magazine server 140. Additionally, the application 136 may detect 405 an inability to communicate between the application 136 and the digital magazine server 140 based on a time between the application 136 communicating a request to the digital magazine server 140 and the application 136 receiving a response from the digital magazine server 140.

While the client device 130 or the application 136 is unable to communicate with the digital magazine server 140, the application 136 receives 410 a set of one or more interactions by the user with one or more content items presented to the user by the application 136. A received interaction is associated with a timestamp indicating a time when the application 136 received 410 the interaction and an identifier of one or more content items associated with the interaction. Example interactions include: posting a content item to the digital magazine server 140, deleting a content item from the digital magazine server 140, editing a content item stored by the digital magazine server 140, sharing a content item stored by the digital magazine server 140 with another user, requesting additional content associated with a content item, providing a comment associated with a content item, or other suitable interaction. In some embodiments, interactions may be received by the application 136 or may be received by another application executing on the client device 130 that communicates information with the application 136.

The application 136 determines 415 a type associated with each of the interactions received 410 while the client device 130 is unable to communicate with the digital magazine server 140. A type associated with an interaction describes a measure of time dependency of the interaction. An interaction having at least a threshold measure of time dependency is undesirable to be performed if at least a threshold time interval has passed since the application 136 associated with the digital magazine server 140 received the interaction as the content item associated with the interaction may have been modified over time. For example, editing a content item has greater than the threshold measure of time dependency as the content item is more likely to be edited or deleted as time elapses, so executing the interaction after greater than a threshold amount of time has passed from receipt of the interaction may result in undesirable or incorrect modification of the content item. As another example, an interaction to provide a comment on a content item has greater than the threshold measure of time dependency as the comment may be duplicative or inconsistent with other comments received during the threshold time interval after the application 136 associated with the digital magazine server 140 receives the interaction to provide the comment. As another example, loading content associated with a content item may be undesirable to perform after a threshold interval of time after a timestamp associated with the interaction to load the content item was received because the user requesting to load the content item may not want to view the content after the threshold interval of time has passed. In contrast, an interaction having less than the threshold measure of time dependency may be performed regardless of a length of time that has elapsed since the interaction was received by the application 136 associated with the digital magazine server 140. The application 136 associated with the digital magazine server 140 may maintain information identifying interactions having less than the threshold measure of time dependency, such as a list identifying interactions likely to provide undesirable or unexpected results if executed greater than a threshold time interval after they are received by the application 136, and determines 415 a type for an interaction based on whether the interaction is included in the list. If an interaction in the set of received interactions is included in the list, the application 136 associated with the digital magazine server 140 associates a type with the interaction indicating the interaction has at least the threshold measure of time dependency; however, if the interaction in the set is not included in the list, the application 136 associated with the digital magazine server 140 associates an alternative type with the interaction. Example interactions having a measure of time dependency equaling or exceeding the threshold include: posting a content item to the digital magazine server 140, deleting a content item from the digital magazine server 140, editing a content item stored by the digital magazine server 140, commenting on a content item stored by the digital magazine server 140, and purchasing an object identified by a content item included in the digital magazine server 140.

In some embodiments, the application 136 also determines a priority associated with various interactions in the set. For example, the application 136 associates a score with an interaction that provides a measure of the priority of the interaction. The application 136 may associate higher scores with interactions having higher priorities. A priority of an interaction may be relative to other interactions in the set or may be based on a specified hierarchy of interactions maintained by the application 136 or by the digital magazine server 140 based on prior user interactions or based on information from an administrator of the digital magazine server 140. For example, interactions that modify a content item have higher priorities than interactions that distribute a content item or request additional information about a content item. In various embodiments, the priority associated with an interaction is based on an amount of modification to a content item associated with the interaction, so interactions that more significantly modify a content item have higher priorities than interactions that less significantly modify the content item.

The application 136 stores 420 one or more interactions from the set of received interactions in a queue on the client device 130 in an order based on the determined types of each of the one or more received interactions, timestamps of each of the received interactions, identifiers of content items associated with the received interactions, or any other suitable information. For example, interactions in the set having a type indicating they have less than the threshold measure of time dependency are identified and stored 420 in the queue in an order based on their associated timestamps so identified interactions with older timestamps have earlier positions in the order. However, interactions in the set having a type indicating greater than a threshold measure of time dependency are not stored 420 in the queue. The application 136 may account for dependencies between interactions when storing 420 the interactions in the queue. For example, interactions modifying a common content item are dependent on each other and are stored 420 in the queue in an order so an interaction that modifies or creates a content item has a higher position in the order than additional interactions that modify the content item having timestamps later than the interaction that modifies or creates the content item. As a specific example, if an interaction provides a comment associated with a content items and an additional interaction edits the comment, the interaction is stored 420 in the queue in a higher position than the additional interaction. As another example, if an interaction deletes a content item, other interactions that modified the content item (e.g., edited the content item, provided comments associated with the content item) or comment are rendered moot, as the modified content item or comment no longer exists. Accordingly, the application 136 stores 420 the interaction that deletes the content item or comment in the queue, but does not store 420 the interactions that modify the content item or comment. In other embodiments, where a priority is determined for the received interactions, interactions associated with higher priorities are stored 420 in higher positions of the queue. When an interaction is stored 420 in the queue, information identifying a type associated with the interaction, an identifier of a content item associated with the interaction, a timestamp associated with the interaction, and any other suitable information is also stored 420.

When the application 136 detects 425 communication with the digital magazine server 140, the application communicates 430 interactions from the queue to the digital magazine server 140. For example, the application 136 receives data from the digital magazine server 140 indicating a connection between the application 136 and the digital magazine server 140 has been established. As another example, the application 136 communicates 430 one or more interactions from the queue to the digital magazine server 140 after detecting 425 at least a threshold connection strength of a connection between the client device 130 and a network 120. Hence, the application 136 communicates 430 interactions from the queue to the digital magazine server 140 in response to detecting 425 communication between the application 136 and the digital magazine server 140. In some embodiments, the application 136 communicates 430 the queue to the digital magazine server 140. Alternatively, the application 136 executes interactions in the queue in the order in which the interactions were stored in the queue by communicating interactions to the digital magazine server 140 when executing the interactions. For example, if the queue includes less than a threshold number of interactions, the application 136 executes the interactions and communicates 430 interactions to the digital magazine server 140 as the interactions are executed.

The digital magazine server 140 may receive queues from multiple client devices 130 each including interactions received by a client device 130 with an application 136 associated with the digital magazine server 140 while the application 136 was unable to communicate with the digital magazine server 140. As described above, each interaction is associated with a type, a timestamp, an identifier associated with the content item associated with the interaction, or any other suitable information. From the received queues, the digital magazine server 140 generates 435 a global queue including interactions from the received queues. When generating 435 the global queue, the digital magazine server 140 may apply one or more filters to the queues and generate 435 the global queue from the results of the filter application. For example, when the digital magazine server 140 identifies an interaction from a received queue, the digital magazine server 140 retrieves other interactions from one or more queues associated with an identifier of a content item associated with the retrieved interaction. If the retrieved interactions from the one or more queues include an interaction to delete the content item corresponding to the identifier, the digital magazine server 140 includes the interaction to delete the content item corresponding to the content item identifier in the global queue, but does not include additional interactions associated with the identifier associated with the content item. This prevents the global queue from including interactions with content items that are subsequently deleted. As another example, the digital magazine server 140 determines whether a content item associated with an identifier associated with an interaction has previously been deleted. If the content item associated with the identifier has been deleted, interactions associated with the identifier are not stored in the global queue. For example, an interaction of posting content associated with a content item such as posting a response to a comment is not included in the global queue if the comment has been deleted by the digital magazine server 140. In other embodiments, the digital magazine server 140 groups interactions from one or more client devices 130 based on content items associated with the interactions and orders interactions associated with a content item based on types associated with the interactions, timestamps associated with the interactions, or modifications to the content item performed by the interactions. For example, the digital magazine server 140 selects interactions performing certain modifications to the content item for inclusion in the global queue. As an example, an interaction associated with a content item of deleting the content item is stored in the global queue while other interactions associated with the content item are not stored in the global queue. Interactions dependent on additional interactions are included in the global queue so the interactions are after the additional interactions in the global queue.

The global queue may be generated 435 and order interactions based on the timestamps, the types of the interactions, the identifiers of the content items, or any other suitable information, as described above regarding the queue stored 420 by the client device 130. For example, the digital magazine server 140 generates 435 the global queue by ordering interactions received from client device 130 based on the timestamps associated with the interactions, so the oldest received interaction has an initial position in the queue. Priorities associated with the received interactions may also be used to generate 435 the global queue. For example, a priority associated with an interaction is based at least in part on the amount of modification to a content item by the interaction, interactions such as deleting a content item have higher priorities and have a higher positions in the order of the global queue than interactions that perform less modification content items (e.g., commenting on the content item). The digital magazine server 140 may also group interactions by content items, order interactions associated with different content items based on their priorities, timestamps, or other information, so that the global queue includes interactions associated with a content item then includes interactions associated with a different content item. The digital magazine server 140 then executes 440 interactions in the global queue in the order in which the interactions are stored in the global queue.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    detecting, at a client device, a loss of communication between the client device and a digital magazine server;
    receiving a set of interactions by a user of the client device with one or more content items presented via a digital magazine application executing on the client device and associated with the digital magazine server while the client device is unable to communicate with the digital magazine server, each interaction associated with a timestamp and a content item;
    determining a type associated with each of the interactions in the set received while the client device is unable to communicate with the digital magazine server, the type associated with an interaction specifying a measure of time dependency of the interaction;
    determining priorities associated with each of the interactions from the set received while the client device is unable to communicate with the digital magazine server, a priority associated with an interaction based on an amount of modification to a content item associated with the interaction by the interaction;
    storing one or more interactions from the set of interactions having types indicating less than a threshold measure of time dependency, which identifies the one or more interactions from the set as capable of being performed by the digital magazine server regardless of a length of time that has elapsed since the client device received the one or more interactions, in an order based on the determined types of the one or more interactions, priorities associated with each of the interactions in the set, and timestamps of the one or more interactions in a queue maintained on the client device when the client device is unable to communicate with the digital magazine server, while not storing one or more other interactions from the set having types indicating greater than the threshold measure of time dependency, which identifies the one or more other interactions of the set as incapable of being performed by the digital magazine server after a threshold time interval has passed since being received by the client device without at least a threshold likelihood of erroneous modification of data by the digital magazine server when the client device is unable to communicate with the digital magazine server; and
    responsive to detecting communication between the client device and the digital magazine server, communicating the queue from the client device to the digital magazine server.

2. The method of claim 1, wherein determining the type with each of the interactions in the set comprises:
    associating a specific type with the interaction in response to the measure of time dependency of the interaction equaling or exceeding a threshold value; and
    associating an alternative type with the interaction in response to the measure of time dependency of the interaction being less than the threshold value.

3. The method of claim 1, wherein determining the type with each of the interactions in the set comprises:
    retrieving a list including one or more interactions;
    associating a specific type with the interaction in response to the list including the interaction; and
    associating an alternative type with the interaction in response to the list not including the interaction.

4. The method of claim 1, wherein storing one or more interactions from the set of interactions in the order based at least in part on the determined types of the one or more interactions and timestamps of the one or more interactions in the queue maintained on the client device comprises:
    storing interactions from the set of interactions associated with one or more specific types in the queue maintained on the client device.

5. The method of claim 1, wherein storing one or more interactions from the set of interactions in the order based at least in part on the determined types of the one or more interactions and timestamps of the one or more interactions in the queue maintained on the client device comprises:
    selecting interactions from the set of interactions having one or more specific types;
    identifying interactions in the selected interactions associated with a particular content item; and storing the identified interactions in the queue in an order based at least in part on timestamps associated with each of the identified interactions.

6. A method comprising:

detecting, at a client device, a loss of communication between the client device and a digital magazine server;

receiving a set of interactions by a user of the client device with one or more content items presented via a digital magazine application executing on the client device and associated with the digital magazine server while the client device is unable to communicate with the digital magazine server, each interaction associated with a timestamp and a content item;

determining a type associated with each of the interactions in the set received while the client device is unable to communicate with the digital magazine server, the type associated with an interaction specifying a measure of time dependency of the interaction; and determining priorities associated with each of the interactions from the set received while the client device is unable to communicate with the digital magazine server, a priority associated with an interaction based on an amount of modification to a content item associated with the interaction by the interaction;

storing one or more interactions from the set of interactions having types indicating less than a threshold measure of time dependency, which identifies the one or more interactions from the set as capable of being performed by the digital magazine server regardless of a length of time that has elapsed since the client device received the one or more interactions, in an order based on the determined types of the one or more interactions, priorities associated with each of the interactions in the set, and timestamps of the one or more interactions in a queue maintained on the client device when the client device is unable to communicate with the digital magazine server, while not storing one or more other interactions from the set having types indicating greater than the threshold measure of time dependency, which identifies the one or more other interactions of the set as incapable of being performed by the digital magazine server after a threshold time interval has passed since being received by the client device without at least a threshold likelihood of erroneous modification of data by the digital magazine server when the client device is unable to communicate with the digital magazine server.

7. The method of claim 6, wherein determining the type with each of the interactions in the set comprises:

associating a specific type with the interaction in response to the measure of time dependency of the interaction equaling or exceeding a threshold value; and associating an alternative type with the interaction in response to the measure of time dependency of the interaction being less than the threshold value.

8. The method of claim 6, wherein determining the type with each of the interactions in the set comprises:

retrieving a list including one or more interactions;

associating a specific type with the interaction in response to the list including the interaction; and associating an alternative type with the interaction in response to the list not including the interaction.

9. The method of claim 6, wherein storing one or more interactions from the set of interactions in the order based at least in part on the determined types of the one or more interactions and timestamps of the one or more interactions in the queue maintained on the client device comprises:

storing interactions from the set of interactions associated with one or more specific types in the queue maintained on the client device.

10. The method of claim 6, wherein storing one or more interactions from the set of interactions in the order based at least in part on the determined types of the one or more interactions and timestamps of the one or more interactions in the queue maintained on the client device comprises:

selecting interactions from the set of interactions having one or more specific types;

identifying interactions in the selected interactions associated with a particular content item; and storing the identified interactions in the queue in an order based at least in part on timestamps associated with each of the identified interactions.

11. The method of claim 6, further comprising:

detecting communication between the client device and the digital magazine server; and communicating one or more interactions from the queue to the digital magazine server.

12. The method of claim 11, wherein communicating one or more interactions from the queue to the digital magazine server comprises:

communicating interactions from the queue to the digital magazine server as the interactions are performed by the client device in response to the queue including less than a threshold number of interactions.

13. A method comprising:

receiving queues of interactions from a set of client devices at a digital magazine server, each queue associated with a client device, generated by the client device when the client device was unable to communicate with the digital magazine server and including one or more interactions received by the client device while the client device was unable to communicate with a digital magazine server and each interaction in a queue associated with a timestamp and a type specifying a measure of time dependency of the interaction less than a threshold measure of time dependency, which identifies the one or more interactions from the set as capable of being performed by the digital magazine server regardless of a length of time that has elapsed since the client device received the one or more interactions, and not including one or more other interactions from the set having types indicating greater than the threshold measure of time dependency, which identifies the one or more other interactions of the set as incapable of being performed by the digital magazine server after a threshold time interval has passed since being received by the client device without at least a threshold likelihood of erroneous modification of data by the digital magazine server interactions, in the queue received from a client device having an order based on types of the one or more interactions, priorities associated with each of the interactions in the set, and timestamps of the one or more interactions;

generating, by the digital magazine server, a global queue including interactions from the received queues in an order determined based at least in part on the timestamps and types associated with the interactions from the received queues; and executing, by the digital magazine server, the interactions in the global queue in the order of the interactions stored in the global queue.

14. The method of claim 13, wherein generating the global queue including interactions from the received queues in the order determined based at least in part on the timestamps and types associated with the interactions from the received queues comprises:

responsive to determining a received queue includes an interaction to delete a content item, including the interaction to delete the content item in the global queue and excluding additional interactions associated with the content item from the global queue.

15. The method of claim 13, wherein generating the global queue including interactions from the received queues in the order determined based at least in part on the timestamps and types associated with the interactions from the received queues comprises:

determining priorities associated with each of the interactions in the received queues, a priority associated with the interaction based on an amount of modification to a content item associated with the interaction by the interaction; and determining the order of interactions in the global queue based at least in part on timestamps associated with the interactions and priorities associated with the interactions.

16. The method of claim 13, wherein generating the global queue including interactions from the received queues in the order determined based at least in part on the timestamps and types associated with the interactions from the received queues comprises:

selecting interactions from the received queues having one or more specific types;

identifying interactions from the selected interactions associated with a particular content item; and storing the identified interactions in the global queue in an order based at least in part on timestamps associated with each of the identified interactions.

* * * * *